United States Patent
Wallner

(10) Patent No.: US 8,076,883 B2
(45) Date of Patent: Dec. 13, 2011

(54) DRIVE SYSTEM AND METHOD FOR OPERATING A DRIVE SYSTEM FOR AN ELECTRONICALLY OPERATED VEHICLE

(75) Inventor: Stefan Wallner, Unterhaching (DE)

(73) Assignee: Proton Motor Fuel Cell GmbH, Starnberg (DE)

( * ) Notice: Subject to any disclaimer, the term of this patent is extended or adjusted under 35 U.S.C. 154(b) by 604 days.

(21) Appl. No.: 11/918,008

(22) PCT Filed: Apr. 7, 2006

(86) PCT No.: PCT/EP2006/003204
§ 371 (c)(1),
(2), (4) Date: Feb. 18, 2009

(87) PCT Pub. No.: WO2006/105986
PCT Pub. Date: Oct. 12, 2006

(65) Prior Publication Data
US 2009/0212725 A1    Aug. 27, 2009

(30) Foreign Application Priority Data
Apr. 8, 2005  (DE) .................. 10 2005 016 300

(51) Int. Cl.
H02P 27/00    (2006.01)
(52) U.S. Cl. ............... 318/400.3; 318/139; 318/717; 318/375; 318/376

(58) Field of Classification Search .......... 318/400.3, 318/139, 375, 376, 717
See application file for complete search history.

(56) References Cited

U.S. PATENT DOCUMENTS

| | | | | |
|---|---|---|---|---|
| 5,323,102 | A * | 6/1994 | Torii et al. | 322/90 |
| 5,929,595 | A * | 7/1999 | Lyons et al. | 320/104 |
| 6,020,696 | A | 2/2000 | Matsunaga et al. | |
| 6,484,830 | B1 | 11/2002 | Gruenwald et al. | |
| 6,982,499 | B1 * | 1/2006 | Kachi et al. | 307/75 |
| 2004/0172206 | A1 | 9/2004 | Saeki et al. | |
| 2005/0061561 | A1 | 3/2005 | Leonardi et al. | |

* cited by examiner

Primary Examiner — Bentsu Ro
Assistant Examiner — David Luo
(74) Attorney, Agent, or Firm — Bingham McCutchen LLP

(57) ABSTRACT

A drive system for an electrically operated vehicle includes an electric drive unit operable as a motor and as a generator, a first power source circuit with a control device for controllably outputting power, a second chargeable and dischargeable power source circuit having at least one capacitor and which is connected in parallel to the drive unit, an electric intermediate circuit connected to the first and the second power source circuits and to the drive unit, a third chargeable and dischargeable power source circuit with at least one battery and which is connected to the intermediate circuit, a first detection device for detecting an electrical voltage of the intermediate circuit, which detection device is connected to the control device, and a second detection device for detecting a characteristic value of the vehicle speed and which is connected to the control device.

17 Claims, 6 Drawing Sheets

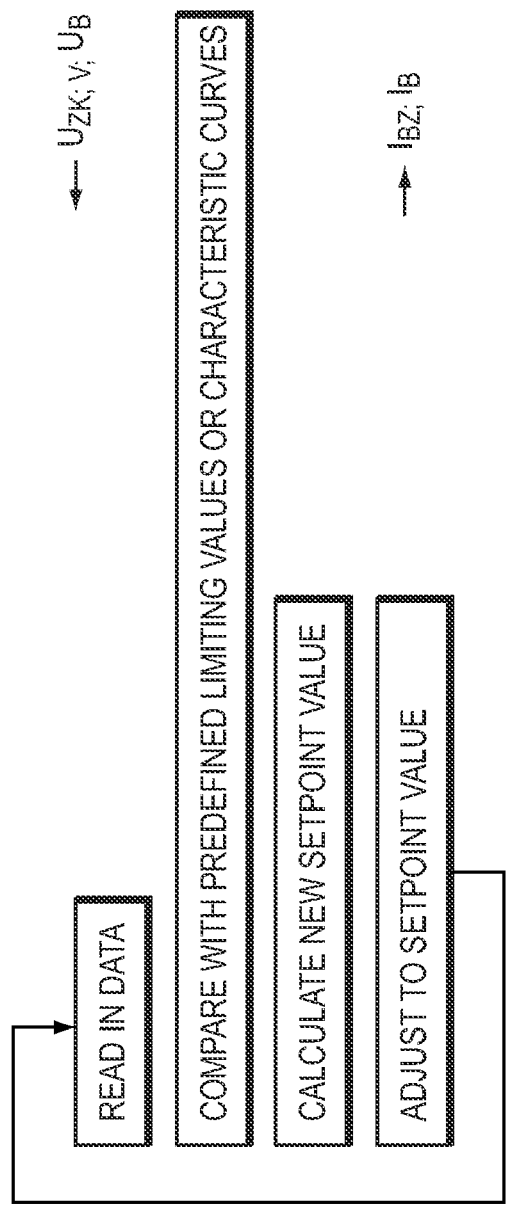

DRIVE SYSTEM AND METHOD FOR OPERATING A DRIVE SYSTEM FOR AN ELECTRONICALLY OPERATED VEHICLE

FIELD OF THE INVENTION

The present invention relates to a drive system for an electrically operated vehicle which has an electric drive unit which can be operated as a motor and as a generator, a first power source circuit with a control device for the purpose of controllably outputting power, a second chargeable and dischargeable power source circuit which is connected parallel to the drive unit, and an electric intermediate circuit which is connected to the first and the second power source circuit and to the drive unit. Furthermore, the invention relates to a method for operating such a drive system.

DESCRIPTION OF THE RELATED ART

Electrically operated vehicles, in particular what are referred to as electric hybrid vehicles, have a drive system which comprises different electric supply circuits in order to operate an electric drive unit of the vehicle. The electrical energy which is necessary for the drive is supplied, for example, by a fuel cell or by an accumulator battery which is connected into the drive train of a hybrid vehicle. In particular, the use of a fuel cell which generates electrical energy from chemical energy carriers, is becoming increasingly important in the drive train of an electrically operated vehicle. The fuel cell is suitable in particular for converting the energy contained in a chemical substance directly into electrical energy in order, for example, to drive a drive unit of an electrically operated vehicle using the acquired electrical energy. The electrical energy of the fuel cell is generally supplied to a supply circuit of the drive train, in particular in the form of an electric intermediate circuit which can be connected to the fuel cell. A drive unit of the electrically operated vehicle, which drive unit comprises one or more electric motors, is supplied by the supply circuit in order to drive the driven wheels of the vehicle. In most applications, the drive unit can also carry out electrical braking with recovery of energy so that it feeds electrical energy back into the supply circuit. This energy can be consumed by other devices which are connected to the supply circuit. For example, it can be stored in an accumulator battery or in a flywheel accumulator. Furthermore, a safety device can be provided in the form of a brake actuator which is designed to absorb a possible excess of energy, in particular to transform it into heat. As a result, at each point in time the supply circuit, for example in the form of a circuit intermediate circuit, exchanges different power flows with the devices or components which are connected to it. These power flows change considerably in the course of the operating time owing to the prevalence of operating states in the drive systems of motor vehicles which last for only a brief time.

For example, in the case of electric hybrid vehicles a plurality of power sources such as, for example, accumulator batteries or double-layer capacitors (for example ultracaps) are used since the latter can additionally buffer electrical energy. As a result, it is possible, for example, to recover braking energy or peak load from buffers. Such drive trains are suitable in particular for town center stop-and-go traffic since in such traffic frequent driving processes with a high peak load alternate with frequent braking processes with corresponding recovery of energy.

In vehicles such as, for example, town buses, taxis, delivery vehicles which are operated predominantly in town center traffic the instantaneous power requirement for the drive system is characterized by the frequent braking and acceleration processes. Since in this context maximum speed to be achieved is already limited by the legal position, the efficiency of such vehicles is characterized above all by the corresponding acceleration power. If it is possible here to absorb the braking energy with low losses and buffer it, the energy requirement can be considerably reduced.

US 2004/0172206 A1 describes a control system for an electrically operated vehicle which has a fuel cell as a power generator. The drive unit, composed of an intermediate output circuit and a drive motor can be operated as a motor and as a generator. The drive unit which is supplied by an electric intermediate circuit has a storage capacitor. The current which can be generated by the fuel cell in order to be fed into the intermediate circuit can be set by a control circuit. In this context, a calculation unit calculates the regenerative electric power which can be generated by the drive unit and made available in the instantaneous operating state, for example on the basis of the vehicle speed or the like. Furthermore, the calculation unit calculates the power which can be stored in the capacitor, for example on the basis of a detected voltage value of the capacitor. If the power which can be stored in the capacitor is less than the regenerative electric power, the output current of the fuel cell is reduced to zero, while if the power which can be stored in the capacitor is greater than the regenerative electric power, the power limitation of the fuel cell is cancelled again. The power source in the form of the fuel cell is thus connected into the circuit or disconnected from it as a function of the regenerative electric power and as a function of state of the capacitor. The energy efficiency of a fuel cell-driven vehicle can thus be improved during the recovery of energy however, other operating states of the drive system are not taken into account here.

SUMMARY OF THE INVENTION

The present invention is based on the aim of specifying a drive system and a method for operating a drive system for an electrically operated vehicle, which system and method permit the energy management in the drive system to be improved for a plurality of operating states of the vehicle.

The drive system for an electrically operated vehicle of the type mentioned at the beginning comprises, according to an embodiment of the invention, in addition to the components mentioned there, a first detection device for an electrical voltage of the intermediate circuit, which detection device is connected to the control device of the first power source circuit, and a second detection device for a characteristic value of the vehicle speed, which is also connected to the control device of the first power source circuit. The control device is embodied in such a way that it sets a modifiable setpoint value for a voltage of the intermediate circuit as a function of the characteristic value of the vehicle speed, and sets the power output of the first power source circuit as a function of the setpoint value and the voltage of the intermediate circuit. Consequently, an electrical voltage of the intermediate circuit and a characteristic value of the vehicle speed can be detected using the detection devices. The setpoint value is set as a function of the characteristic value of the vehicle speed, with the voltage of the intermediate circuit being made to follow the setpoint value by correspondingly setting the power output of the first power source circuit.

According to the invention it is thus possible to keep the drive system of an electrically operated vehicle largely in an optimum energy operating state for different operating states of the vehicle. The level of the intermediate circuit voltage is influenced by the vehicle speed so that a corresponding voltage value is applied to the second chargeable and dischargeable power source circuit which is connected parallel to the drive unit. If the second power source circuit comprises, for example, a store for storing electric charges, in particular one or more double-layer capacitors, a setpoint value of the capacitor charge is set using the setpoint value of the intermediate circuit voltage. This permits the energy content of the second power source circuit to be influenced as a function of the vehicle speed. It is therefore possible to switch over from, for example, "strong acceleration" to "high braking energy recovery" for different operating states. All the operating states therebetween can also basically be covered. The energy management is consequently dependent above all on the values of the intermediate circuit voltage and of the vehicle speed. As a function of these values, the controller intervenes in the power released by the first power source circuit, which circuit outputs, for example, a higher current into the intermediate circuit when the intermediate circuit voltage is low than when the intermediate circuit voltage is relatively high. The controller is largely independent here of the specific electrical wiring of the components. The limiting values of the controller are dependent on the vehicle speed of the vehicle.

According to one embodiment of the invention, the setpoint value for the voltage of the intermediate circuit is increased when the vehicle speed drops, and decreased when the vehicle speed rises. It is thus possible to ensure that at low vehicle speeds a relatively high intermediate circuit voltage is present at the second power source circuit so that if capacitors in the second power source circuit are used to store electrical energy, they can be correspondingly charged to a greater extent at low vehicle speeds. As a result, their stored energy is available for acceleration processes of the vehicle. On the other hand, at high vehicle speeds and when the intermediate circuit voltage is low it is possible to ensure that capacitors in the second power source circuit are correspondingly charged to a lesser degree and can thus take up a comparatively large amount of braking energy. Since capacitors also have a high current conducting capacity, in this way it is possible to implement comparatively powerful acceleration and braking processes solely using energy which is buffered, or is to be buffered in the second power source circuit.

In one embodiment of the invention, the control device sets the setpoint value for the voltage of the intermediate circuit to a maximum value if the vehicle is in a stationary state, and to a minimum value if the vehicle speed is at a maximum. Correspondingly, there is an increased acceleration capacity of the vehicle in the stationary state, and there is improved recovery of braking energy at the maximum speed.

In a further embodiment of the invention, a third chargeable and dischargeable power source circuit, which is connected to the intermediate circuit, is also provided in the drive system. In particular, the third power source circuit is connected to the intermediate circuit in such a way that the third power source circuit feeds power into the intermediate circuit if a threshold value of the voltage of the intermediate circuit is reached or undershot. Such an embodiment of a drive system is particularly advantageous in a case in which the second power source circuit comprises at least one capacitor, in particular a double-layer capacitor, and the third power source circuit comprises at least a battery. The capacitor can function here as what is referred to as a seconds store, while the battery function as what is referred to as a minutes store if the threshold value of the intermediate circuit voltage is reached or undershot. This also makes it possible for the power output of the first power source circuit to be kept largely uniform so that what is referred to as the basic load of the drive system can be made available via the first power source circuit. This is advantageous in particular if when a fuel cell which generates electrical power by means of an electrochemical reaction is used in the first power source circuit. It is therefore possible to avoid highly fluctuating operating states of the fuel cell, such as are implemented, for example, in US 2004/0172206 A1, so that there is no need for a complex controller, provided with a short reaction time, for the supply of the chemical energy carriers.

In one embodiment of the invention, the charge power of the third power source circuit is set as a function of the voltage of the intermediate circuit. It is thus possible for the charge power of a battery which is provided in the third power source circuit to be set as a function of the load requirement of the drive system. Additionally or alternatively, the charge power of the third power source circuit is preferably set as a function of its charge state. This makes it possible to avoid a situation in which high charge currents flow, for example, when the vehicle is braked, or high charge currents flow from the fuel cell into the battery of the third power source circuit. This makes it possible to prevent the service life of the battery being reduced by high charge currents.

An embodiment of the invention also relates to a vehicle having an electric hybrid drive comprising an electric drive system according to the invention.

BRIEF DESCRIPTION OF THE DRAWINGS

The invention is explained in more detail below with reference to the Figures of the drawing which illustrate exemplary embodiments of the present invention. In said drawing:

FIG. 3 is a state table of an exemplary relationship between the setpoint value of the intermediate circuit voltage and the speed of the vehicle, FIG. 4 is a flowchart showing the detection and calculation of different parameters when a drive system according to the invention is operated.

DESCRIPTION OF PREFERRED
EMBODIMENTS OF THE INVENTION

Figure 1:
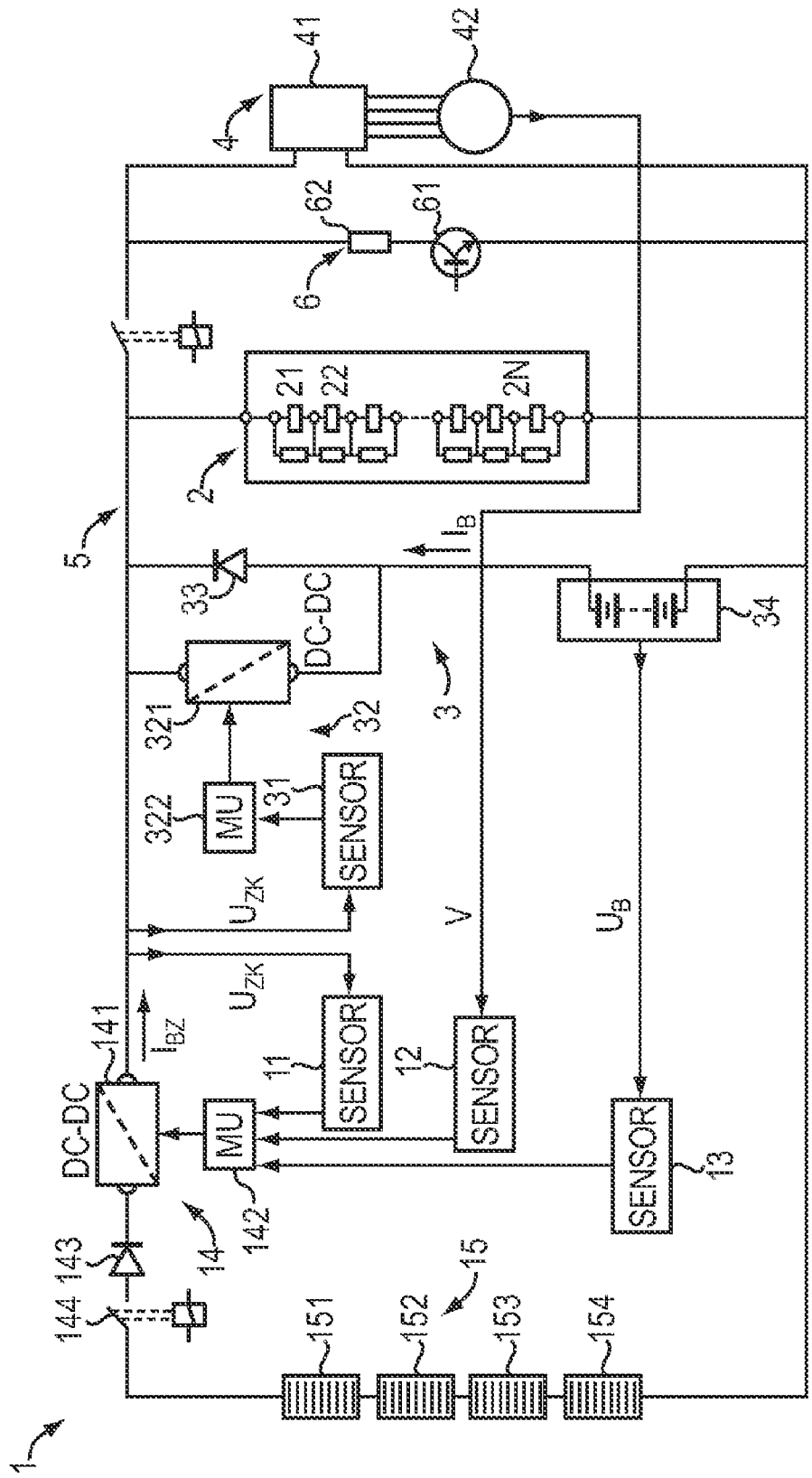
FIG. 1 shows a circuit arrangement of an embodiment of a drive system according to the invention for an electrically operated vehicle.

FIG. 1 illustrates a circuit arrangement of an embodiment of a drive system according to the invention for an electrically operated vehicle in the form of what is referred to as an electric hybrid vehicle. An intermediate circuit 5 serves predominantly as a supply circuit for a drive unit 4 which comprises one or more electric motors. The electric motor 42 (shown in FIG. 1) of the drive unit 4 is actuated by a transformer 41 which transforms the direct voltage of the intermediate circuit 5 into an alternating voltage system for the drive of the electric motor 42. A permanently excited synchronous machine into whose stator winding a three-phase voltage system is fed in order to build up a rotating field is, for example, used as the drive motor. In the opposite case of the generator mode of the drive machine 42, the power which is generated by the generator is fed into the intermediate circuit 5 by the transformer 41. The drive machine 42 serves to drive the driven wheels of the vehicle, with a corresponding braking force being applied to the driven wheels in the generator mode of the drive machine 42. If a plurality of drive machines are used, they are located, for example, directly on the wheel hubs of the vehicle.

A plurality of power source circuits as described below are used to supply the drive unit 4 with electrical energy. In the present exemplary embodiment, a first power source circuit 1 comprises a fuel cell arrangement 15 with a plurality of fuel cells 151 to 15n. A fuel cell is an electrochemical cell which converts the reaction energy of a continuously supplied fuel and of an oxidizing agent into useable electrical energy. Basically, a fuel cell is composed of two electrodes, which are separated from one another by a diaphragm or an electrolyte. The fuel flows around the anode (positive pole) and is oxidized there, while the oxidizing agent flows around the cathode (negative pole) and is reduced there. In order to obtain a relatively high voltage, a plurality of cells can be connected in series to form what is referred to as a stack, as in the present exemplary embodiment according to FIG. 1.

The power source circuit 1 also comprises a control device 14 with which closed-loop control of the power output of the fuel cell arrangement 15 can be performed. The control device 14 comprises here a DC-DC transformer 141, upstream of which a diode 143 and a switch 144 are connected. The current $I_{BZ}$ of the fuel cell arrangement 15 is fed into the intermediate circuit 5 using the transformer 141.

Furthermore, the drive system comprises a second chargeable and dischargeable power source circuit 2 which is connected parallel to the drive unit 4. The second power source circuit 2 comprises a plurality of accumulators for storing electrical charges, in particular individual double-layer capacitors 21 to 2n (referred to as ultracaps) which are connected in series. Ultracaps are distinguished here by a relatively large energy density compared to conventional capacitors. The electrodes of the ultracaps store the energy electrostatically, in contrast to batteries or accumulator batteries which generate and store the electrical energy chemically. Depending on requirements (capacitance, dielectric strength, terminal voltage), the individual capacitors can be connected in series and/or in parallel. A double-layer capacitor with a matching size is well suited to the storage function here in terms of performance and costs. The required service life of this component is also very well suited to the stop-and-go of a vehicle. Its electric behavior permits a double-layer capacitor to be used as what is referred to as a seconds store for outputting and storing brief high currents in a drive system.

In particular, a third power source circuit 3 which comprises an arrangement of one or more batteries 34, is provided for assisting the fuel cell arrangement 15, specifically at the maximum speed of the vehicle or on uphill stretches. The battery 34 according to FIG. 1 is connected to the intermediate circuit 5 via a DC-DC transformer 321 of a closed-loop control circuit 32. The closed-loop control circuit 32 is provided in particular for setting the charge power of the battery 34. A diode 33 is connected in the forward direction between the power source in the form of the battery 34 and the intermediate circuit 5, wherein the closed-loop control circuit 32 is connected parallel to the diode 33 between the battery 34 and the intermediate circuit 5. The battery 34 serves, owing to its characteristic as a so-called minutes store, to assist the fuel cell in the aforesaid operating states.

According to FIG. 1, a drive system for an electrically operated vehicle is made available which can meet different requirements in terms of the energy management in different operating states of the vehicle. In order to drive the vehicle, the electric drive machine 42 drives the driven wheels as described, while the drive machine 42 operates as a generator when the vehicle is braked and generates power in the braking mode. The power from the braking mode is buffered in the battery 34 or the ultracaps 21 to 2n until the charge capacity is reached. The residual braking power is thermally destroyed in a brake actuator 6 only if the accumulators are full. This brake actuator 6 here has a brake resistor 62 and a power switch 61.

The drive system according to the present invention also comprises a plurality of detection devices for different parameters. A first detection device 3 in the form of a measuring sensor serves to detect an electrical voltage $U_{ZK}$ of the intermediate circuit 5, a second detection device 12, also in the form of a measuring sensor, serves to detect a characteristic value of the vehicle speed v. The characteristic value of the vehicle speed v can be acquired in different ways and/or represent different measurement variables: according to the present exemplary embodiment a rotational speed signal of the drive machine 42 is processed in order to detect a characteristic value for the vehicle speed. In another embodiment, it is possible, instead, to further process a signal of the speed display of the vehicle (speedometer signal). For the control functions to be performed it is sufficient to process a signal in a form which permits conclusions to be drawn about the travel speed, either directly or indirectly.

A third detection device 13, which detects a charge state of the power source circuit 3, in particular the charge state of the battery 34, is also provided. The charge state is determined in lead batteries by the no-load voltage, and in other batteries by measuring the current and balancing the currents which flow in and out of the battery. For the present case in which a lead battery is used, the battery voltage $U_B$ is supplied from the battery 34 to the detection device 13 in the form of a measuring sensor.

The detection devices 11 to 13 are connected to a measuring transducer (MU) 142 of the control device 14. The measuring transducer 142 serves to actuate the transformer 141. Furthermore, a measuring transducer 322 of the closed-loop control circuit 32 is provided in order to actuate the transformer 321 for performing open-loop control of the charge power of the battery 34. The closed-loop control circuit 32, in particular the measuring transducer 322, is connected to the detection device 31 for detecting the intermediate circuit voltage $U_{ZK}$, in which case the detection device 31 can be embodied separately or in a unit with the detection device 11.

The control device 14, which is formed in particular by the measuring transducer 142, which contains, for example, a microprocessor, and the transformer 141 is embodied in such a way that it sets a modifiable setpoint value $U_{ZKsoll}$ for the voltage of the intermediate circuit as a function of the characteristic value of the vehicle speed v, and sets the power output of the power source circuit 1, in particular the current $I_{BZ}$, as a function of the setpoint value $U_{ZKsoll}$ and the voltage $U_{ZK}$ of the intermediate circuit. In other words, the electrical voltage $U_{ZK}$ of the intermediate circuit and a characteristic value of the vehicle speed v are detected, in which case the setpoint value $U_{ZKsoll}$ is set as a function of the characteristic value of the vehicle speed v. Since the power output of the fuel cell arrangement 15 is correspondingly set, the voltage $U_{ZK}$ of the intermediate circuit is made to follow the setpoint value $U_{ZKsoll}$.

Figure 2:
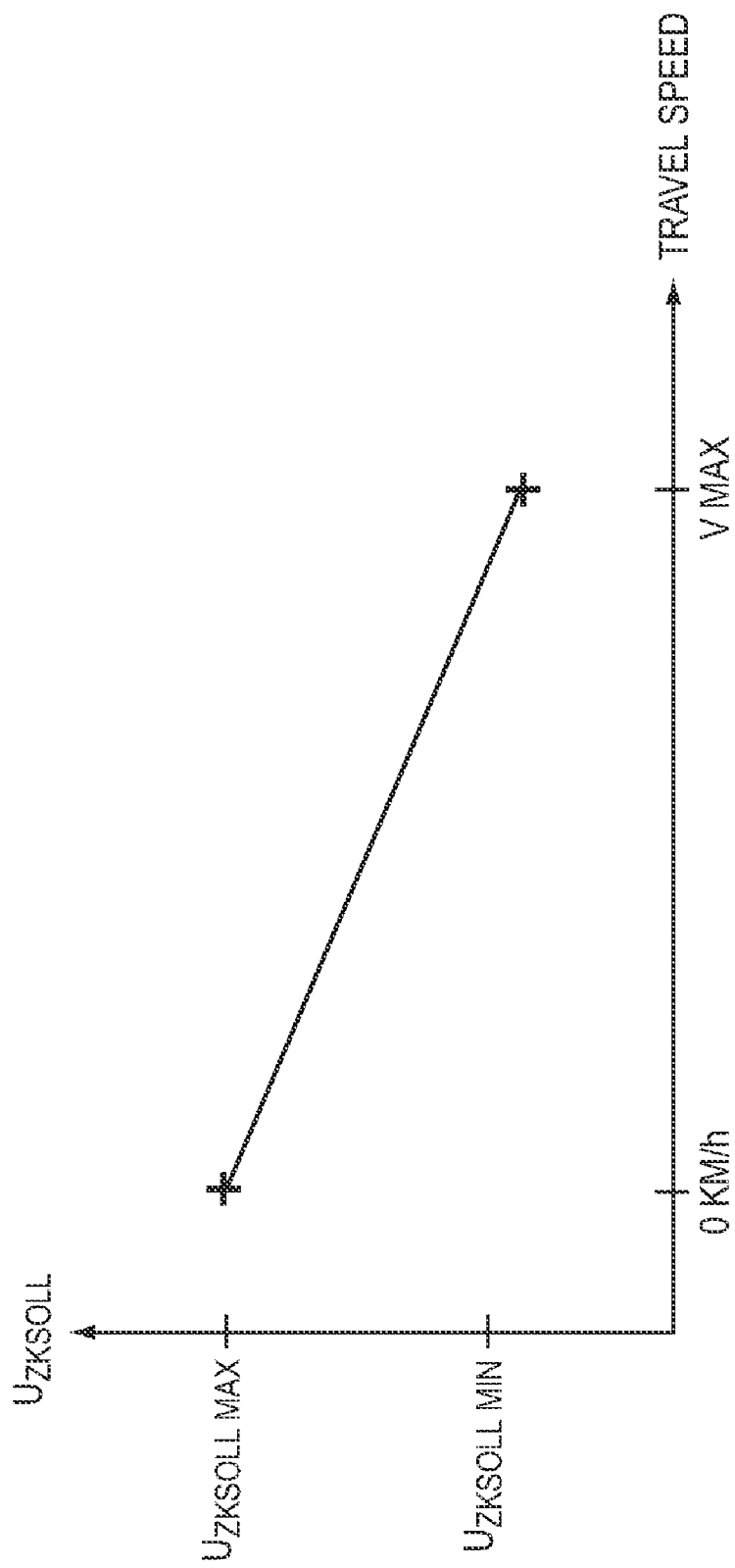
FIG. 2 is a graphic illustration of an exemplary relationship between the setpoint value of the intermediate circuit voltage and the speed of the vehicle.

An exemplary relationship between the setpoint value of the intermediate voltage and the vehicle speed is illustrated graphically in FIG. 2. Here, the setpoint value $U_{ZKsoll}$ for the voltage of the intermediate circuit is set along a linear characteristic curve as a function of the vehicle speed v, in which case the setpoint value $U_{ZKsoll}$ is increased when the vehicle speed v drops, and is decreased when the vehicle speed v rises. Correspondingly, the control device 14 sets the setpoint value $U_{ZKsoll}$ to a maximum value $U_{ZKsoll\,max}$ if the vehicle is in the stationary state and to a minimum value $U_{ZKsoll\,min}$ if the vehicle speed is at a maximum ($V_{max}$). Between the maximum and minimum values, the setpoint value is set along a linear characteristic curve as a function of the vehicle speed v. However, other profiles of a setpoint value are also conceivable here as a function of the vehicle speed v in order to be able to meet different load requirements, for example in addition to a modified vehicle weight.

The text below will explain the described control characteristic of the control device 14 and the associated improved energy management of the drive system according to the invention using an example:

If the drive machine 42 requires power, the ultracaps 21 to 2n output energy according to their characteristic, and the intermediate circuit voltage $U_{ZK}$ drops below the setpoint value $U_{ZKsoll}$. The lower the intermediate circuit voltage $U_{ZK}$, the more power is released from the fuel cell arrangement up to the maximum current $I_{BZ\,max}$. The controller releases power from the fuel cell arrangement, and the current $I_{BZ}$ flows into the intermediate circuit 5 in order to adjust the intermediate circuit voltage $U_{ZK}$ back to the setpoint value. This takes place until an equilibrium is established or the maximum current $I_{BZ\,max}$ is reached. If $U_{ZK}$ drops further as far as a lower threshold $U_{Bmax}$, the battery 34 is activated and supplies the lacking quantity of energy in accordance with the requested power. The intermediate circuit voltage $U_{ZK}$ is consequently a measure of the requested power. The intermediate circuit voltage $U_{ZK}$ is a measure of the energy content of the ultracaps 21 to 2n and thus of the charge in the capacitor.

According to the invention, the controller of the drive system for different operating states is intended to provide an optimum energy management system. For this reason, the setpoint value of the capacitor charge and thus the intermediate circuit voltage are influenced by the vehicle speed. As a result, it is possible to switch over from "high acceleration" to "high braking energy recovery" for different operating states. All the states therebetween can also be covered. FIG. 3 shows in this context a state table for an exemplary relationship between the setpoint value of the intermediate circuit voltage and the travel speed.

FIG. 4 shows a flowchart of the detection and the calculation of the various parameters while the drive system according to the invention is operating. First, the parameters of the intermediate circuit voltage $U_{ZK}$ characteristic value of the travel speed v and battery voltage $U_B$ are read in. Then, a comparison is made with the predefined limiting values or characteristic curves. The new setpoint value of the intermediate circuit voltage $U_{ZKsoll}$ is then calculated. The voltage $U_{ZK}$ of the intermediate circuit is then made to follow the setpoint value $U_{ZKsoll}$, in which case the current $I_{BZ}$ of the fuel cell arrangement is correspondingly set, and if this is not sufficient, current $I_B$ is additionally fed into the intermediate circuit from the battery.

Figure 5:
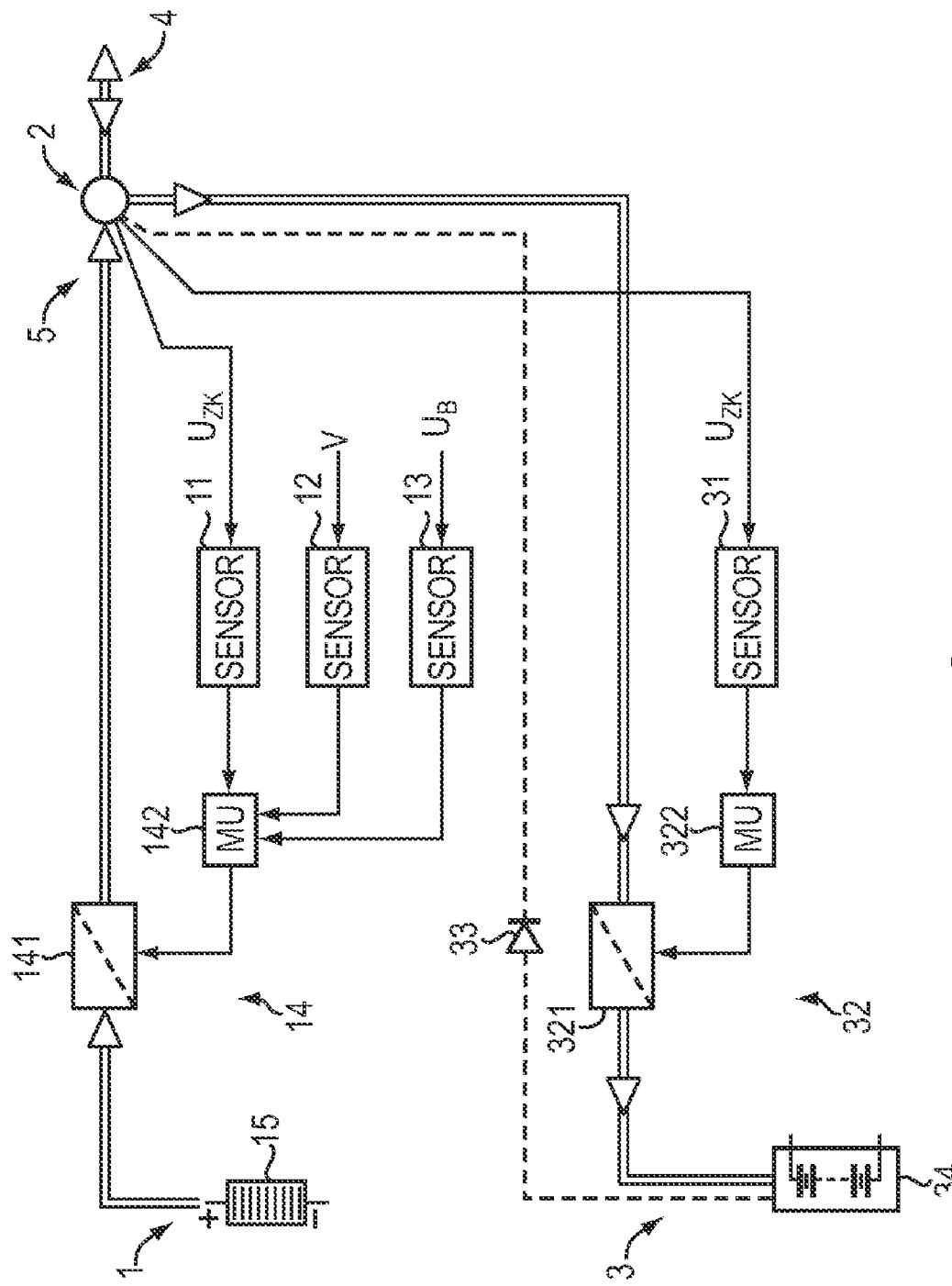
FIG. 5 shows a power flow diagram illustrating an exemplary power flow between the various components of a drive system according to the invention.

FIG. 5 is a flowchart illustrating an exemplary power flow between the various components of the drive system according to the invention as per FIG. 1. In the example described above, the charging of the battery 34 and of the ultracaps 21 to 2n is not controlled so that high charge currents can flow into the battery when braking occurs or from the fuel cell. However, in this context high charge currents reduce the service life of the battery. For this reason, closed-loop control is performed on the charge current of the battery as a function of the charge state of said battery. In accordance with the charge state, the closed-loop control circuit 32 enables the transformer 321. The charge current depends on the current load request and thus on $U_{ZK}$. The closer $U_{ZK}$ to $U_{ZKsoll}$, the higher the possible setting for the charge current.

The energy management for the drive system according to the embodiment in FIG. 1 is therefore dependent on only three variables which are to be measured: intermediate circuit voltage $U_{ZKsoll}$, speed of the vehicle v (load request) and charge state of the battery. The controller intervenes actively only in the power release of the fuel cell arrangement and of the charge regulator of the battery. The limiting values of the controller are dependent on the travel speed of the vehicle.

The principle on which the controller according to the invention is based is that the power of the transformer of the power source circuit 1 is increased in direct proportion to the extent to which the capacitor or the capacitors in the power source circuit 2 are discharged. Given a maximum intermediate circuit voltage, the power from the fuel cell arrangement corresponds to the charge power of the battery. If energy is extracted from the capacitor accumulator, the intermediate circuit voltage becomes smaller and the power of the fuel cell arrangement is increased while the charge power of the battery is simultaneously decreased until it reaches its maximum efficiency. In order to prevent the capacitors being completely charged again in the case of relatively long journeys down gradual negative gradients (since there is no power drain or a small power drain), the speed signal shifts the limiting values of the intermediate circuit voltage for 0% and 100% fuel-cell power drain downwards, so that in the case of relatively long downhill journeys the fuel cell arrangement is prevented from feeding energy into the drive system. In addition, the power output is set by the control device 14 in such a way that the power output is reduced in direct proportion to the increase in the stored charge in the battery 34. The power in the fuel cell arrangement is therefore reduced in direct proportion to the degree to which the battery is filled. The no-load voltage of the battery is used here as a measure of the charge state of the battery.

Before the fuel cell is switched on, the capacitors of the power source circuit 2 are charged to the rated voltage of the battery 34. This corresponds to the low energy level of the accumulator. The level of the electrical voltage at the accumulator characterizes the usable energy content. The fuel cell arrangement can then be easily started, since sufficient power to supply the media is available from the battery or battery arrangement. After the fuel cell arrangement is enabled, the double-layer capacitors are charged to the maximum value corresponding to the stored closed-loop control characteristic. The basic aim here is, as described by way of example above, to have the accumulator as full as possible in the stationary state of the vehicle in order to ensure full assistance for the acceleration process. When the maximum speed of the vehicle is reached, the accumulator must be emptied as far as the battery voltage in order to be able to take up energy at the next braking process.

The closed-loop control behavior of the closed-loop control circuit 32 according to FIG. 1 can be characterized as follows: first, the intermediate circuit voltage $U_{ZK}$ serves as a closed-loop control variable for the battery charge power. Here it is a basic principle that the power of the transformer 321 is increased in direct proportion to the charging of the capacitors. Given a maximum intermediate circuit voltage $U_{ZK}$ the battery charge power is 100%. If energy is extracted from the capacitors of the power source circuit 2, the voltage becomes lower, and the battery charge power is, for example, reduced linearly until it is then zero. The influence of the charge state of the battery is taken into account here. The maximum charge current is given a lower setting corresponding to the charge state of the battery. This means that the fuller the battery, the lower the charge current or the battery charge power. In addition, the influence of the gassing voltage, which must not exceed 2.4 V per cell in all cases when lead batteries are used, is taken into account.

With the present drive system according to the invention the following emergency running properties can be obtained: if the fuel cell arrangement switches off owing to a fault, the residual electrical drive system remains available without restriction. The braking energy can still be taken up from the capacitors. However, the battery or battery arrangement must make available significantly higher power levels, which results in particular in relatively high thermal loading. The range of the vehicle is also very limited owing to the restricted energy content of the battery.

If the capacitors of the power source circuit 2 are discharged to such an extent that the intermediate circuit voltage $U_{ZK}$ has dropped to the level of the battery rated voltage, virtually the entire usable energy thereof is available (the battery feeds into the system and the system follows the battery voltage, in addition power is released by the capacitors, specifically in accordance with the difference between the no-load voltage of the battery and the battery voltage under full load). When this operating state is reached, the fuel cell arrangement is adjusted to its maximum efficiency. Each additional requirement of power can then be output directly by the battery 34 via the power diode 33 into the intermediate circuit 5.

If the capacitors are completely discharged (as-delivered state or after a longer downtime with the battery disconnected), the capacitor arrangement can be charged from the battery to battery voltage via a precharging resistor. The precharging resistor, which connects the upper terminal of the battery 34 to the upper terminal of the capacitor arrangement 2, is not illustrated in FIG. 1 for the sake of clarity.

In addition, a drive system according to the invention also has the following additional advantage: when a fuel cell arrangement is switched off, sufficient energy, for example for secondary loads such as lighting, travel direction indicators and the like, is available for relatively long stops. The battery power can be used to produce an anti-frost protection and to heat parts of the fuel cell arrangement so that they remain above 0° C.

Figure 6:
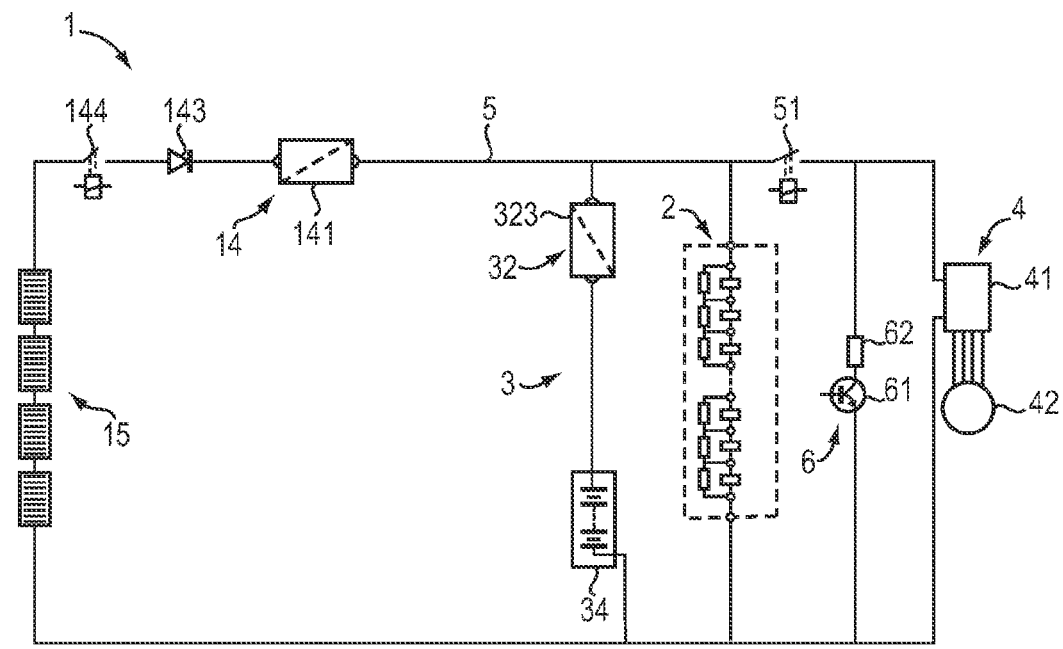
FIGS. 6-8 show circuit arrangements of further variants of a drive system according to the invention.

FIG. 6 shows a circuit arrangement of a further variant of a drive system according to the invention compared to the circuit arrangement according to FIG. 1. The power source circuit 3 has a closed-loop control circuit 32 for the charge power with a transformer 323 which is connected between the battery 34 and the intermediate circuit 5. The rest of the wiring of the drive system corresponds to the circuit arrangement according to FIG. 1. For the sake of clarity the detection devices with the corresponding measuring sensors and the measuring transducers, which actuate the transformers 141 and 323, are not illustrated in FIG. 6. The closed-loop control circuit 32 is embodied in such a way that current is fed from the battery 34 into the intermediate circuit 5 as a function of the charge state of the power source circuit 2. The transformer 323 operates in a bi-directional fashion, and the efficiency of the transformer has to be correspondingly high in the direction of the outputting of power from the battery 34. A further advantage of the circuit according to FIG. 6 is that with the possibility of performing bi-directional control of the transformer 323 an additional degree of freedom is acquired in the energy management of the drive system.

Figure 7:
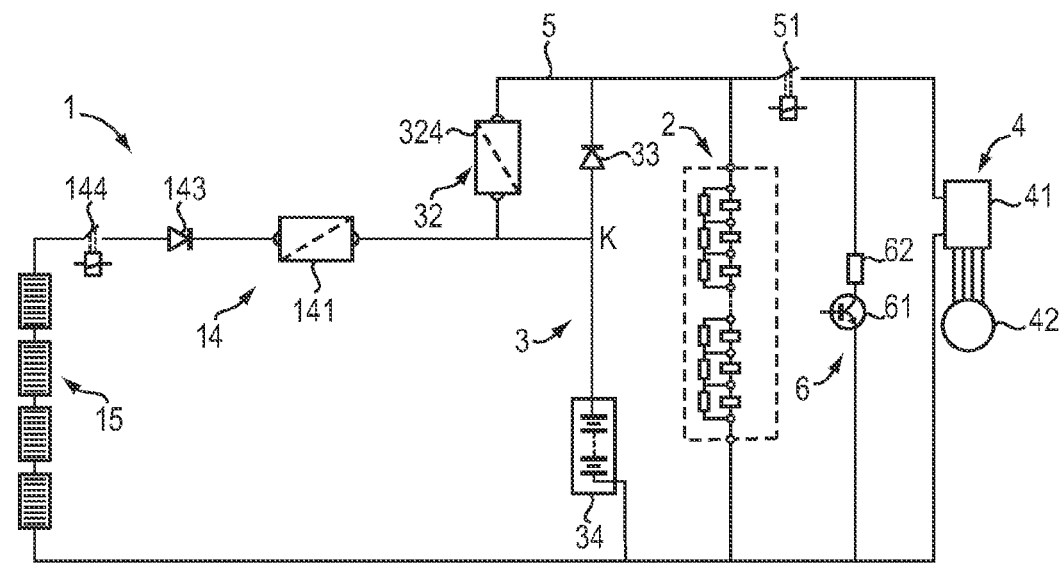

FIG. 7 shows a further variant of a circuit arrangement of a drive system according to the invention, compared to the circuit arrangement according to FIG. 1. Here, the power source circuit 1 is connected to the connection node K between the battery 34 and the diode 33. The detection devices with the measuring transducers are not illustrated in FIG. 7 for the sake of clarity, and the same applies subsequently to FIG. 8. The flow of energy of the fuel cell arrangement 15 in the direction of the power source circuit 2 with the capacitors must also be taken up by the transformer 324. In contrast, when the battery 34 is charged from the fuel cell arrangement 15, the path via the transformer 324 is no longer necessary. Overall, with this arrangement it is possible to give the fuel cell arrangement 15 smaller dimensions, in which case the battery 34 will operate more strongly. Again an additional degree of freedom is acquired by adjusting such an operating mode by means of the transformer 324.

Figure 8:
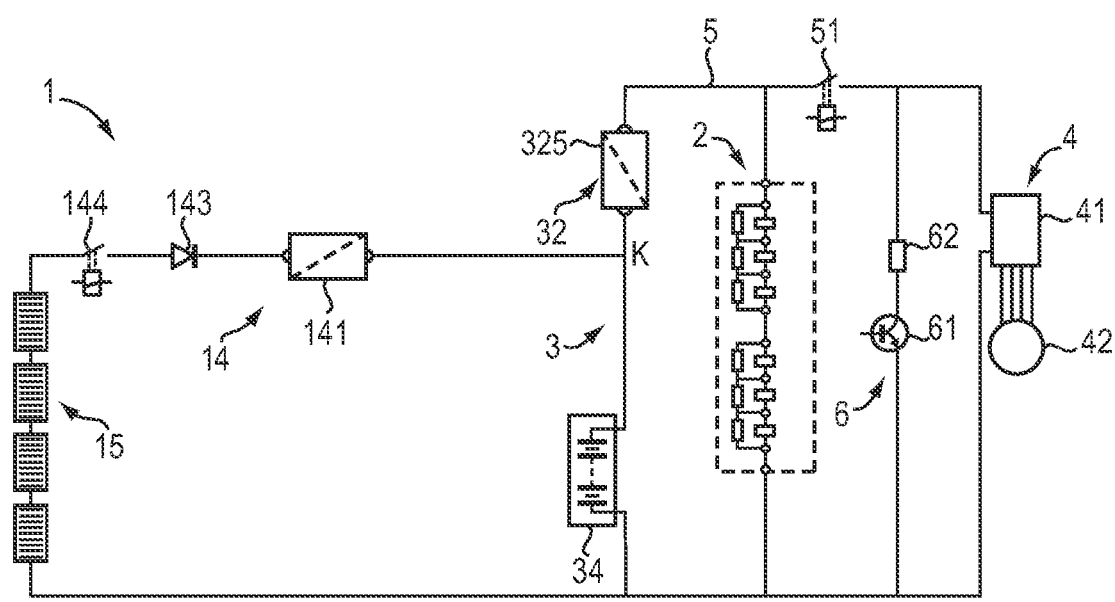

FIG. 8 shows a further variant of a circuit arrangement of a drive system according to the invention compared to the circuit arrangement according to FIG. 6. The power source circuit 1 is connected to the connection node K between the battery 34 and the closed-loop control circuit 32 with the transformer 325. The transformer 325 operates in a bi-directional fashion. The flow of energy of the fuel cell arrangement 15 in the direction of the intermediate circuit 5 must also be taken up by this transformer. In contrast, when the battery 34 is charged from the fuel cell arrangement 15, the path via the transformer 325 is no longer necessary. The feeding of current from the battery 34 into the intermediate circuit 5 can now be closed-loop controlled as a function of the charge state of the capacitors of the power source circuit 2. The efficiency of the transformer 325 in the direction of the outputting of power from the battery 34 must also be correspondingly high. Overall, with this arrangement it is possible to give the fuel cell arrangement 15 smaller dimensions, in which case the battery 34 will operate more strongly.

The invention claimed is:

1. A drive system for an electrically operated vehicle, comprising:
　an electric drive unit operable as a motor and as a generator,
　a first power source circuit with a control device for controllably outputting power,
　a second chargeable and dischargeable power source circuit having at least one capacitor and which is connected in parallel to the drive unit,
　an electric intermediate circuit connected to the first and the second power source circuits and to the drive unit,
　a third chargeable and dischargeable power source circuit with at least one battery and which is connected to the intermediate circuit,
　a first detection device for detecting an electrical voltage of the intermediate circuit, which detection device is connected to the control device, and
　a second detection device for detecting a characteristic value of the vehicle speed and which is connected to the control device,
　wherein the control device sets a modifiable setpoint value for a voltage of the intermediate circuit as a function of the characteristic value of the vehicle speed and sets a power output of the first power source circuit as a function of the setpoint value and the voltage of the intermediate circuit, and
　further wherein the third power source circuit is connected to the intermediate circuit, whereby the third power source circuit feeds power into the intermediate circuit if a threshold value of the voltage of the intermediate circuit is reached or undershot.

2. The drive system as claimed in claim 1, wherein the control device increases the setpoint value for the voltage of the intermediate circuit when the vehicle speed drops and decreases the setpoint value when the vehicle speed rises.

3. The drive system as claimed in claim 1 or 2, wherein the control device sets the setpoint value for the voltage of the intermediate circuit to a maximum value if the vehicle is in a stationary state, and to a minimum value if the vehicle speed is at a maximum.

4. The drive system as claimed in claim 3, wherein the control device sets the setpoint value between the maximum and the minimum values along a linear characteristic curve as a function of the characteristic value of the vehicle speed.

5. The drive system as claimed in claim 1 or 2, wherein:
the first power source circuit comprises at least one fuel cell, which generates electric power by means of an electrochemical reaction, and
the second power source circuit comprises a store for storing electrical charge.

6. The drive system as claimed in claim 1 or 2, further comprising:
a third detection device which detects a charge state of the third power source circuit and which is connected to the control device,
wherein the control device reduces the power output as a level of stored charge in the third power source circuit increases.

7. The drive system as claimed in claim 1 or 2, wherein:
the third power source circuit comprises at least one diode and a closed-loop control circuit for a charge power,
the diode is connected in a forward direction between the at least one battery and the intermediate circuit, and
the closed-loop control circuit is connected parallel to the diode between the at least one battery and the intermediate circuit.

8. The drive system as claimed in claim 7 wherein the first power source circuit is connected to a connection node between the at least one battery and the diode.

9. The drive system as claimed in claim 1 or 2, wherein:
the third power source circuit has a closed-loop control circuit for a charge power,
which closed-loop control circuit is connected between the at least one battery and the intermediate circuit, and
current is fed from the at least one battery into the intermediate circuit under closed-loop control as a function of a charge state of the second power source circuit.

10. The drive system as claimed in claim 9 wherein the first power source circuit is connected to a connection node between the at least one battery and the closed-loop control circuit.

11. A vehicle having an electric hybrid drive comprising an electric drive system as claimed in claim 1.

12. The drive system as claimed in claim 1 or 2, wherein the third power source circuit comprises a closed-loop control circuit for the charge power,
which closed-loop control circuit is connected to the first detection device and which sets the charge power as a function of the voltage of the intermediate circuit.

13. A method for operating a drive system for an electrically operated vehicle, which comprises:
an electric drive unit operable as a motor and as a generator,
a first power source circuit, a second chargeable and dischargeable power source circuit comprising at least one capacitor and which is connected in parallel to the drive unit, and a third chargeable and dischargeable power source circuit comprising at least one battery and which is connected to an electric intermediate circuit,
the electric intermediate circuit connected to the first and second power source circuits and to the drive unit,
the method comprising the steps of:
sensing an electric voltage of the intermediate circuit and a characteristic value of the vehicle speed,
setting a setpoint value for a voltage of the intermediate circuit as a function of the characteristic value of the vehicle speed,
causing the voltage of the intermediate circuit to follow the setpoint value for the voltage of the intermediate circuit, and correspondingly setting the power output of the first power source circuit to the setpoint value, and
causing the third power source circuit to feed power into the intermediate circuit if a threshold value of the voltage of the intermediate circuit is reached or undershot.

14. The method as claimed in claim 13, wherein the setpoint value for the voltage of the intermediate circuit is increased when the vehicle speed drops, and is decreased when the vehicle speed rises.

15. The method as claimed in one of claim 13 or 14, wherein the setpoint value for the voltage of the intermediate circuit is set along a linear characteristic curve as a function of the characteristic value of the vehicle speed.

16. The method as claimed in claim 13 or 14, wherein a charge power of the third power source circuit is set as a function of the voltage of the intermediate circuit.

17. The method as claimed in claim 13 or 14, wherein a charge power of the third power source circuit is set as a function of its charge state.

* * * * *